United States Patent [19]
Tanaka et al.

[11] Patent Number: 5,946,663
[45] Date of Patent: Aug. 31, 1999

[54] METHOD OF PLANNING A PRODUCTION SCHEDULE AND AN APPARATUS FOR PLANNING A PRODUCTION SCHEDULE

[75] Inventors: Masayuki Tanaka, Yawata; Hirokazu Kominami, Kakogawa; Satoru Yamamura, Kyoto; Yukinori Miura, Izumi; Itsuhiro Yamada, Hirakata; Kazuhiro Shintani, Neyagawa; Masahiro Uenishi, Akashi, all of Japan

[73] Assignee: Matsushia Electric Industrial Co., Ltd., Osaka-Fu, Japan

[21] Appl. No.: 08/757,566

[22] Filed: Nov. 27, 1996

[30] Foreign Application Priority Data

Nov. 30, 1995 [JP] Japan .................................. 7-312189

[51] Int. Cl.⁶ .................................................... G06F 19/00
[52] U.S. Cl. .................... 705/8; 364/468.05; 364/468.09
[58] Field of Search ............... 705/8, 9, 28; 364/468.01, 364/468.03, 468.05, 468.06, 468.07, 468.12, 468.09, 468.28

[56] References Cited

U.S. PATENT DOCUMENTS

| | | | |
|---|---|---|---|
| 5,040,123 | 8/1991 | Barber et al. ................................ | 705/8 |
| 5,101,352 | 3/1992 | Rembert ............................. | 364/468.03 |
| 5,212,791 | 5/1993 | Damian et al. ............................ | 705/29 |
| 5,233,533 | 8/1993 | Edstrom et al. ............................. | 705/8 |
| 5,295,065 | 3/1994 | Chapman et al. .......................... | 705/8 |
| 5,369,570 | 11/1994 | Parad .......................................... | 705/8 |
| 5,402,349 | 3/1995 | Fujita et al. ........................ | 364/468.03 |
| 5,841,659 | 11/1998 | Tanaka et al. ...................... | 364/468.28 |

*Primary Examiner*—Melanie A. Kemper
*Attorney, Agent, or Firm*—Panitch, Schwarze, Jacobs & Nadel, P.C.

[57] ABSTRACT

The method of planning a production schedule of the present invention has a production order preparing unit which, in response to an order, the completed product stock is allocated to the previous production schedule planned before an order change, and which prepares a production order. The production schedule which is previously planned is allocated to the production order which has been subjected to allocation of the completed product stock to the order, in accordance with information such as the product identification, the quantity, and the delivery time. The allocated portion of the previous production schedule is used as it is in the current production schedule.

4 Claims, 7 Drawing Sheets

METHOD OF PLANNING A PRODUCTION SCHEDULE AND AN APPARATUS FOR PLANNING A PRODUCTION SCHEDULE

FIELD OF THE INVENTION AND RELATED ART STATEMENT

1. Field of the Invention

The invention relates to a method of planning a production schedule which can cope with a change in order (order information) in the manufacturing industry, and particularly to a method of planning a production schedule which is effective in planning of a schedule of a production having a complex operating process such as machining, and an apparatus for planning a production schedule which automatically executes the method.

2. Description of the Related Art

In order to respond to recent requests of multikind, small quantity, and short-term delivery in the manufacturing industry and also to efficiently perform production, various methods of planning a production schedule by using mainly a computer have been developed. Such methods can rapidly plan a production schedule which is substantially optimum, by using the OR (Operations Research) technique, the knowledge engineering, or simulation techniques, and are effectively used in assembly processes such as those of mounting and assembling electronic components onto a printed circuit board.

Generally, operating processes such as a machining process in the manufacturing industry have a larger number of operating steps than assembly processes such as that described above, and involve various kinds of operations (engineering methods). In such fields of the manufacturing industry, it is often that operations such as those of switching the identification of the product to another one require a long operating time period in the unit of days. In planning of a production schedule, therefore, reduction of the number of processes of switching product identifications is an important factor for improving the production efficiency.

In fields of the manufacturing industry having operating processes, generally, the production lead time which is a period from reception of raw materials to completion of a product must be long. When production is started after an order is received, therefore, the period required for completing the product is prolonged. To comply with this, in such fields of the manufacturing industry, a so-called prospective production which is started before an order is received is conducted. In the prospective production, production processes are executed on the basis of an uncertain order, and, when an order change occurs, the production processes must be changed as required at a minimum degree so as to cope with the order change.

Consequently, it has been requested to develop a method capable of rapidly planning a production schedule which can cope with an order change by a change of a minimum degree, thereby preventing the production efficiency from being lowered. However, a method of planning a production schedule which can satisfy such a request has not been proposed.

In the prior art, the following two methods are known as usual methods of planning a production schedule which can cope with an order change.

In the first conventional method, a large stock is secured so as to absorb an order change. However, the first method has a problem in that the excessive stock causes large losses in management.

In the second conventional method, a production schedule is replanned from the beginning. In the second method, however, the schedule is largely changed and hence the operation site is confused, thereby producing a problem in productivity. The second method has also a problem in production efficiency.

In order to cope with an order change, therefore, it has been requested to develop a method of planning a production schedule which can reflect the variations in the schedule while following the previously planned production schedule as far as possible.

In operating processes, it is often that steps such as part or component processing steps are complicated such that various kinds of operations (engineering methods) are conducted. For example, parts which are designated by the same identification of the product in the charging step are designated by different identifications (namely, the identification of the product is changed) in steps subsequent to a certain step in accordance with the kinds of completed products. Depending on the kind of the operation, the optimum lot size and the yield may be different. Therefore, it is necessary to efficiently cope with an order change in consideration of such circumstances (or conditions).

The OR technique and the knowledge engineering technique, in which, when an order change occurs, a production schedule is replanned from the beginning and optimum operations are selected have a problem in high-speed planning of a production schedule.

By contrast, simulation techniques in which a production schedule is planned by simulating production steps of a product is suitable for high-speed planning of a production schedule. In this case, however, the number of processes of switching part or product identifications is increased and hence the operating time period for the switching processes is prolonged, with the result that it is difficult to plan a production schedule of a high production efficiency.

OBJECT AND SUMMARY OF THE INVENTION

It is an object of the invention to provide a method of planning a production schedule which can solve the problems of the prior art and rapidly plan a production schedule of operating processes which can easily cope with an order change while ensuring a high production efficiency, and an apparatus for planning a production schedule which executes the method.

In order to attain the object, the method of planning a production schedule of the invention comprises:

an operating data storing step of, in order to plan a production schedule in a processing factory, storing management data such as order information, stock information, and a production schedule, and basic data of the processing factory;

a completed product stock allocating step of allocating order information to completed product stock information, and determining an order which is to be subjected to production (hereinafter, such an order is referred to as "order to be produced");

a production schedule allocating step of integrating an order among orders to be produced, the order being included in a previous production schedule planned before an order change, into a new production schedule as a production-scheduled order;

a production schedule deleting step of deleting a production schedule of the previous production schedule planned before the order change, this production schedule not including the orders to be produced; and an operation request information preparing step of determining a production order from the orders to be produced, the production order being to be again subjected to planning of the new production schedule, the operation request information preparing step comprising:

an operation developing step of preparing operation request information for determining a sequence of operations to be executed, from operation pattern information for producing a product for each production order, and obtaining the operation request information consisting of at least one operation pattern;

an operation unit production quantity calculating step of allocating operation request information for each production order to an intermediate stock, and obtaining a quantity which is to be actually produced, for each operation; and an operation unit charge quantity calculating step of obtaining a quantity to be charged, on the basis of non-defective product rate information of each operation.

The apparatus for planning a production schedule of the invention comprises:

operating data storing means for, in order to plan a production schedule in a processing factory, storing management data such as order information, stock information, and a production schedule, and basic data of the processing factory;

completed product stock allocating means for allocating order information to completed product stock information, and determining an order to be produced;

production schedule allocating means for integrating an order among orders to be produced, the order being included in a previous production schedule planned before an order change, into a new production schedule as a production-scheduled order;

production schedule deleting means for deleting a production schedule of the previous production schedule planned before the order change, this previous production schedule not including the orders to be produced; and operation request information preparing means for determining a production order from the orders to be produced, the production order being to be again subjected to planning of a production schedule, the operation request information preparing means comprising:

operation developing means for preparing operation request information for determining a sequence of operations to be executed, from operation pattern information for producing a product for each production order, and obtaining the operation request information consisting of at least one operation pattern;

operation unit production quantity calculating means for allocating operation request information for each production order to an intermediate stock, and obtaining a quantity which is to be actually produced, for each operation; and operation unit charge quantity calculating means for obtaining a quantity to be charged, on the basis of non-defective product rate information of each operation.

The method of planning a production schedule and the apparatus for planning a production schedule of the present invention have a production order preparing step of preparing a production order in accordance with the order information, the completed product stock information, and the previous production schedule planned before an order change. In the step, the completed product stock is allocated to the order information. Thereafter, an allocation process is conducted on the remaining order information in accordance with the production schedule which is planned previously (before the order change) and in consideration of information such as the product identification, the quantity, and the delivery time. The allocated portion of orders is used as it is in the current production schedule. At the timing when the previous production schedule is planned, there are correspondence relationships between production orders and respective data of the production schedule. In the current production schedule after the order change, the allocation process is conducted in disregard of the correspondence relationships. As a result of the allocation process, the portion of the previous production schedule planned before the order change which can be allocated in the current production schedule after the order change, and production orders corresponding to the portion remain as they are. The other portion of the previous production schedule is deleted. With respect to the portion of the order information to which nothing is allocated, new production orders are additionally prepared. When the production schedule is planned in this way, the previously prepared production schedule can be used as a portion of the new production schedule, and hence the production schedule can cope with the order change by conducting a change of a small degree on the schedule.

The method of planning a production schedule of the present invention plans automatically and efficiently a production schedule which can fulfill a production order by a minimum level of production activity. In the method, an operation request information producing process (operation developing step) in which operation request information in the unit of an operation is developed and prepared on the basis of the production order is provided with information of an intermediate stock in the unit of operation of each product, and yield information.

According to the method of planning a production schedule of the present invention, an operation unit production quantity calculating step in which an intermediate stock is allocated to individual developed operation request information and the production quantity is calculated, and an operation unit charge quantity calculating step in which the quantity to be charged is calculated with considering the yield in the quantity which is to be actually produced are executed. The intermediate stock in the unit of operation of each product means the stock of parts or raw materials which is obtained when the operation is ended under the state where the product can be completed by executing all the remaining operations. In this way, the intermediate stock and the yield are determined in accordance with a combination of a product identification and an operation. Therefore, it is not always necessary to determine an extra intermediate product identification. Accordingly, the method of planning a production schedule of the present invention can deal these kinds of information in a unified manner, and can easily plan a production schedule in which production is conducted at a minimum level in consideration of the intermediate stock and the yield.

According to the method of planning a production schedule of the present invention, in the case where the target product is configured by plural parts or where semimanufactures which are not completed as products are divided into plural kinds of products (parts) by different operations (engineering methods), part configuration information indicating the set membership of the parts (products), and operation pattern information showing the production processes of the parts (products) in the form of an operation pattern which is linear (i.e., production processes in which there is no branching or joining) are provided.

According to the method of planning a production schedule of the present invention, an operation pattern of the whole of the product is synthesized from these kinds of information, and the resulting operation pattern Is subjected to an operation request information producing process in which a part developing step and an operation developing step are conducted in the same manner as the method of planning a production schedule described above. According to this configuration, a product which is produced from plural parts, a common member from which various kinds of products or parts are produced, and the like can be easily registered, and hence the operation request information producing process can be realized by a combination of simple processes. As a result, also for a complex processing, it is possible to plan a production schedule in which the intermediate stock and the yield are considered.

According to the method of planning a production schedule of the present invention, when a production schedule is to be planned for operation request information in the case where the operation pattern of the production of the product contains operations having different optimum lot sizes, operation request information is arranged by using the product identification, the operation, the date and hour when the operation can be started (hereinafter, referred to as "operation start enabled date and hour"), etc. as key data, and thereafter a lot-size optimizing step in which an optimum lot is set by dividing or joining the operation request information so as to attain an optimum lot size is executed. According to the method of planning a production schedule of the present invention, in a simulation, a simulation step in which dispatching to the resource is conducted in the unit of a lot and the production schedule is planned is executed. In the method of planning a production schedule of the present invention, therefore, operation request information prepared in the operation request information preparing processing is divided or joined in consideration of the product identification, the operation, the operation start enabled date and hour, etc., thereby setting lots. The quantity in each lot is set to be a value which is close to an optimum lot. When a production schedule is to be planned, dispatching to the resource is conducted in the unit of a lot. In each lot, the operation start enabled date and hour are determined to be equal to the latest date and hour among the operation start enabled dates and hours of the operation request information constituting the lot. As a result of such setting, the method of planning a production schedule of the present invention can plan a production schedule in which operations are executed in the unit of an appropriate lot in consideration of restrictions such as the equipment, and the production efficiency.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereinafter, a preferred embodiment of the method of planning a production schedule and the apparatus for planning a production schedule of the present invention will be described with reference to FIGS. 1 to 7.

Figure 1:
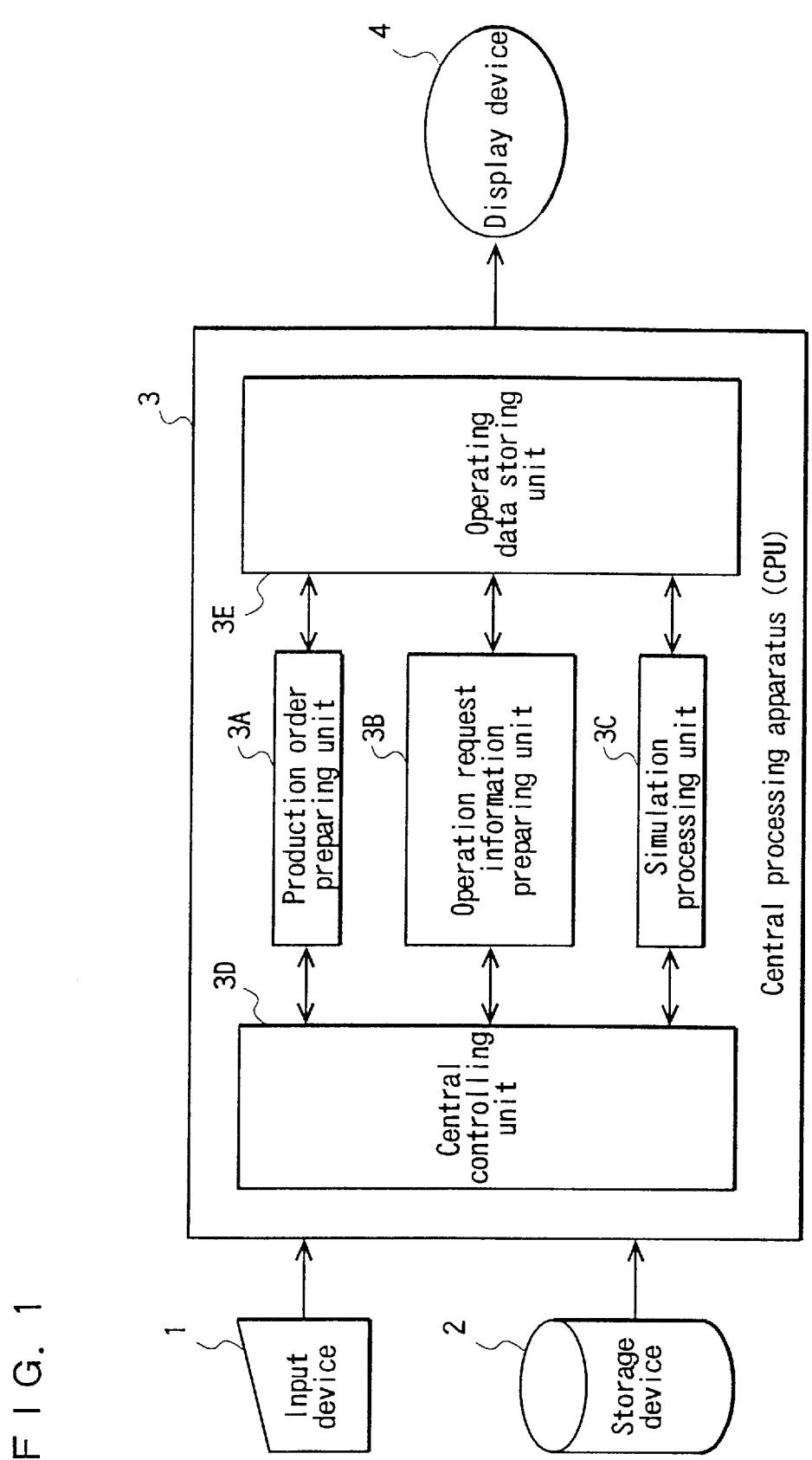
FIG. 1 is a block diagram showing the configuration of an apparatus for planning a production schedule which is a preferred embodiment of the present invention.

Referring to FIG. 1, a storage device 2 stores basic data of a factory and management data which are required for planning a production schedule. For example, the basic data include operating days of the factory, an operating time, contents of operations of machines, and the abilities of the machines, and the management data include order information, stock information, and a production schedule. The basic data and the management data are input and corrected through an input device 1. A central processing apparatus 3 automatically plans a production schedule, and manages and controls the devices as a whole. A display device 4 displays data of the storage device 2, a planned production schedule, etc.

The central processing apparatus 3 comprises a production order preparing unit 3A, an operation request information preparing unit 33, a simulation processing unit 3C, a central controlling unit 3D, and an operating data storing unit 3E. The production order preparing unit 3A prepares a production order consisting of the kind of a product which is to be actually produced, the quantity, and others, from an order (order information).

The operation request information preparing unit 3B subjects the production order to operation-development, and prepares operation request information in consideration of the intermediate stock and the yield. The operation-development means determination of operating steps required for producing a target product. The simulation processing unit 3C incorporates operations into the resource such as the production equipment and plans a production schedule, on the basis of the operation request information prepared in the operation request information preparing unit 3B. The central controlling unit 3D controls processings of the production order preparing unit 3A, the operation request information preparing unit 3B, and the simulation processing unit 3C. The operating data storing unit 3E is disposed so as to store operating data used in each processing and transfer data between the units.

Figure 2:
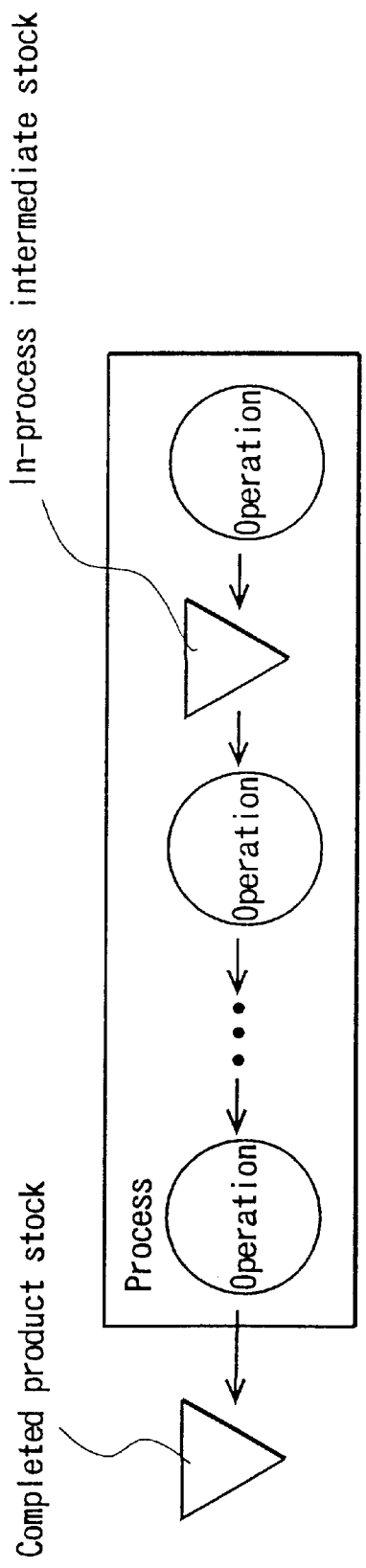
FIG. 2 is a diagram schematically showing a process which is an object of the production schedule in the embodiment of FIG. 1.

FIG. 2 is a diagram schematically showing the flow of operations of a process which is an object of a production schedule in a processing factory. As shown in FIG. 2, a completed product is produced by way of plural operations in the factory, and then stocked. In some cases, parts of a considerably quantity are stocked between the operations of the process, as an in-process intermediate stock.

Figure 3:
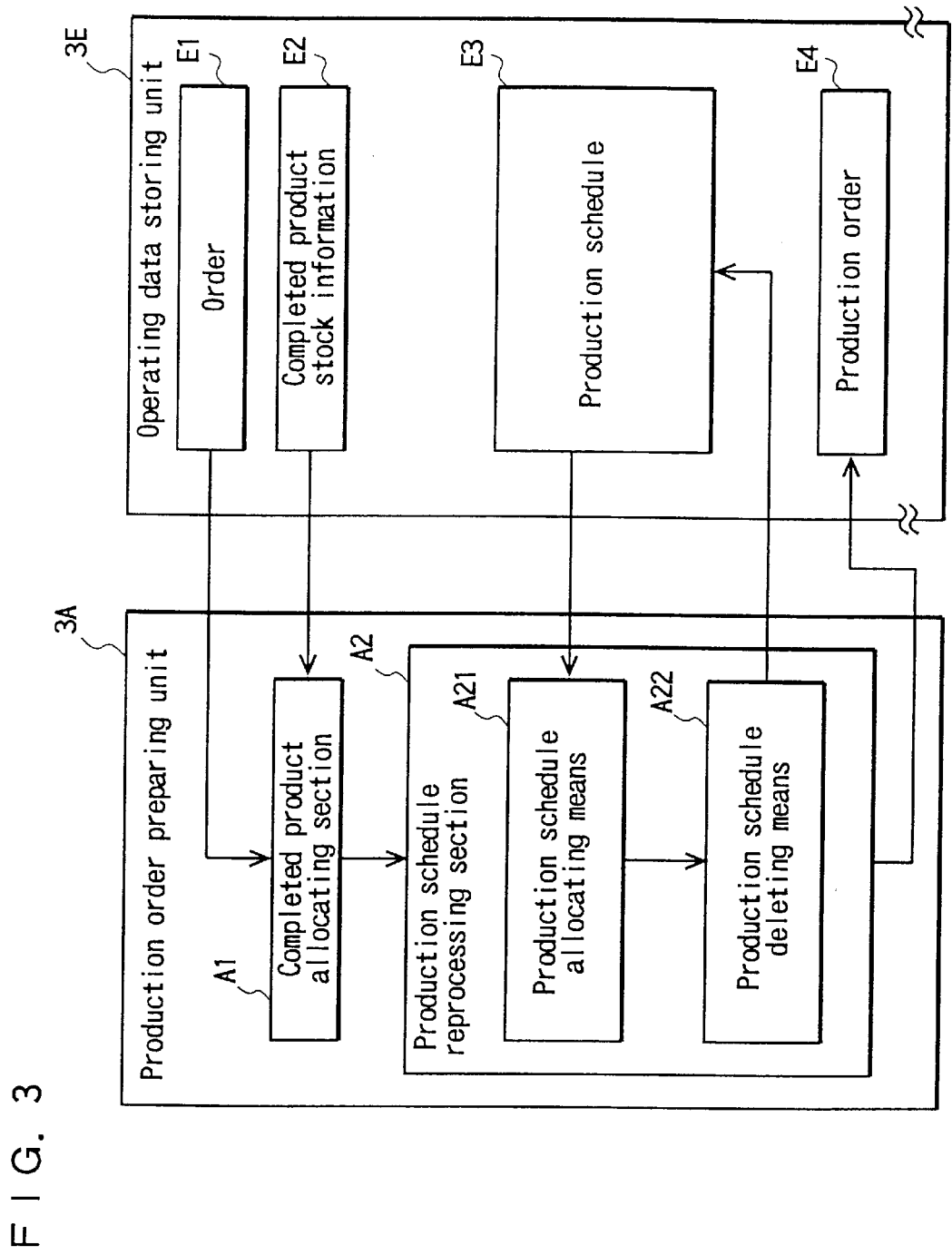
FIG. 3 is a block diagram showing a production order preparing processing in the embodiment of FIG. 1.

FIG. 3 is a block diagram showing the production order preparing unit 3A and a portion of the operating data storing unit 3E which are shown in FIG. 1. The operation in the case of an order change will be described with reference to FIG. 3.

First, order information E1 and completed product stock information E2 which are stored in the operating data storing unit 3E are sent to a completed product allocating section A1 of the production order preparing unit 3A. In the section, the completed product stock is allocated to the order information E1, and the quantity of products which are to be actually produced is obtained. Specifically, the quantity of products which are to be actually produced is calculated by an expression of "quantity in the order−quantity of stocked completed products=quantity of products which are to be actually produced." The quantity of products which are to be actually produced is sent as production order information P to a production schedule reprocessing section A2.

In the production schedule reprocessing section A2, production schedule allocating means A21 conducts a search operation on the production order information P so as to check whether the information contains orders which can be allocated to a previous production schedule E3 planned before the order change or not. If the production order information P contains orders which are already included in the previous production schedule E3 planned before the order change, the production order information is labeled as information which is already included in the previous production schedule, and returned as a production order E4 to the operating data storing unit 3E.

The portion of the previous production schedule E3 planned before the order change to which the production order information P is not allocated is deleted in production schedule deleting means A22. The previous production schedule E3 in which a portion has been subjected to the deletion is returned as a portion of the new production schedule to the operating data storing unit 3E.

In this way, the production schedule allocating means A21 allocates the production order information P to the previous production schedule E3 planned before the order change, with respect to a product identification which is included in both the information and the schedule. In the allocation processing, conditions such as the quantity and the delivery time are considered with significance the degree of which depends on the strategy of the planning of the production schedule.

Figure 4:
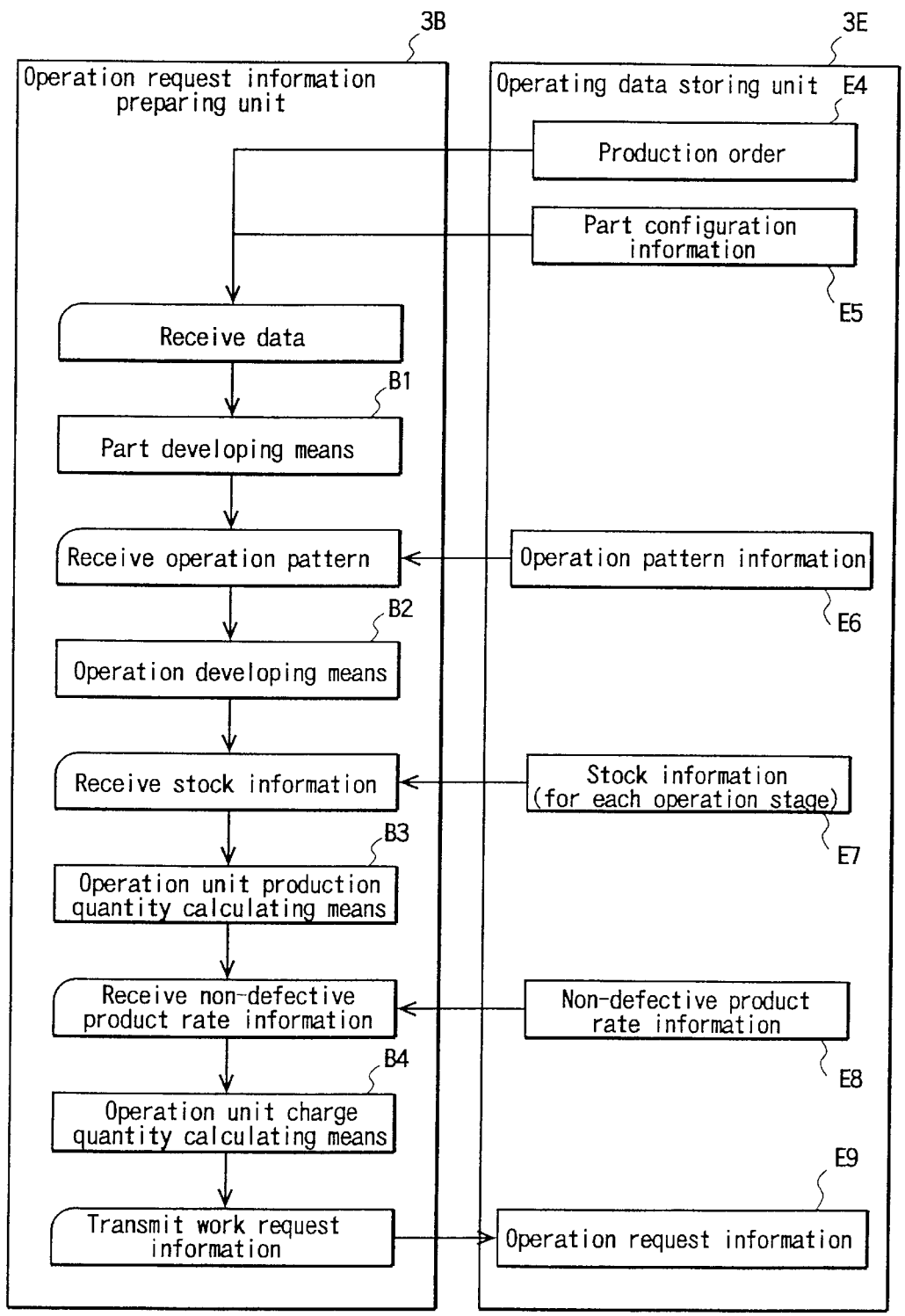
FIG. 4 is a block diagram showing an operation request information preparing processing in the embodiment of FIG. 1.

FIG. 4 is a block diagram showing the operation request information preparing unit 3B and a portion of the operating data storing unit 3E which are shown in FIG. 1.

Referring to FIG. 4, among the production order information P which requires a new production schedule, a production order E4, part configuration information E5, and operation pattern information 86 are transferred from the operating data storing unit 3E to the operation request information preparing unit 3B. In the case where a product in the production order E4 is configured by plural parts or the same product identification is used for different products up to a midpoint of the processing, part developing means B1 conducts part-development on such a product. The part-development means determination of the kinds, the quantity, and the arrangement timing of parts and materials required for producing of a product which is a production object.

In the operation request information preparing unit 3B, thereafter, operation developing means B2 conducts operation-development on the production order E4 by using the operation pattern information E6 of the operating data storing unit 3E. The operation-development means determination of a sequence of operations in the form of a time series which are necessary for producing the product which is the production object.

Next, stock information E7 for each operating step, i.e., information including the actual quantities of parts of the in-process intermediate stock, and the minimum stock quantity which must be always ensured is sent from the operating data storing unit 3E to the operation request information preparing unit 3B.

In the operation request information preparing unit 3B, operation unit production quantity calculating means B3 conducts allocation of the production order E4 to the in-process intermediate stock, and calculates the quantity which is to be produced in each operation.

Next, non-defective product rate information E8 is sent from the operating data storing unit 3E to the operation request information preparing unit 3B. In the operation request information preparing unit 3B, operation unit charge quantity calculating means B4 calculates a quantity to be charged in each operation. The operation unit charge quantity calculating means B4 sets the charge quantity and prepares operation request information E9. The operation request information E9 is again transferred to the operating data storing unit 3E.

Figure 5:
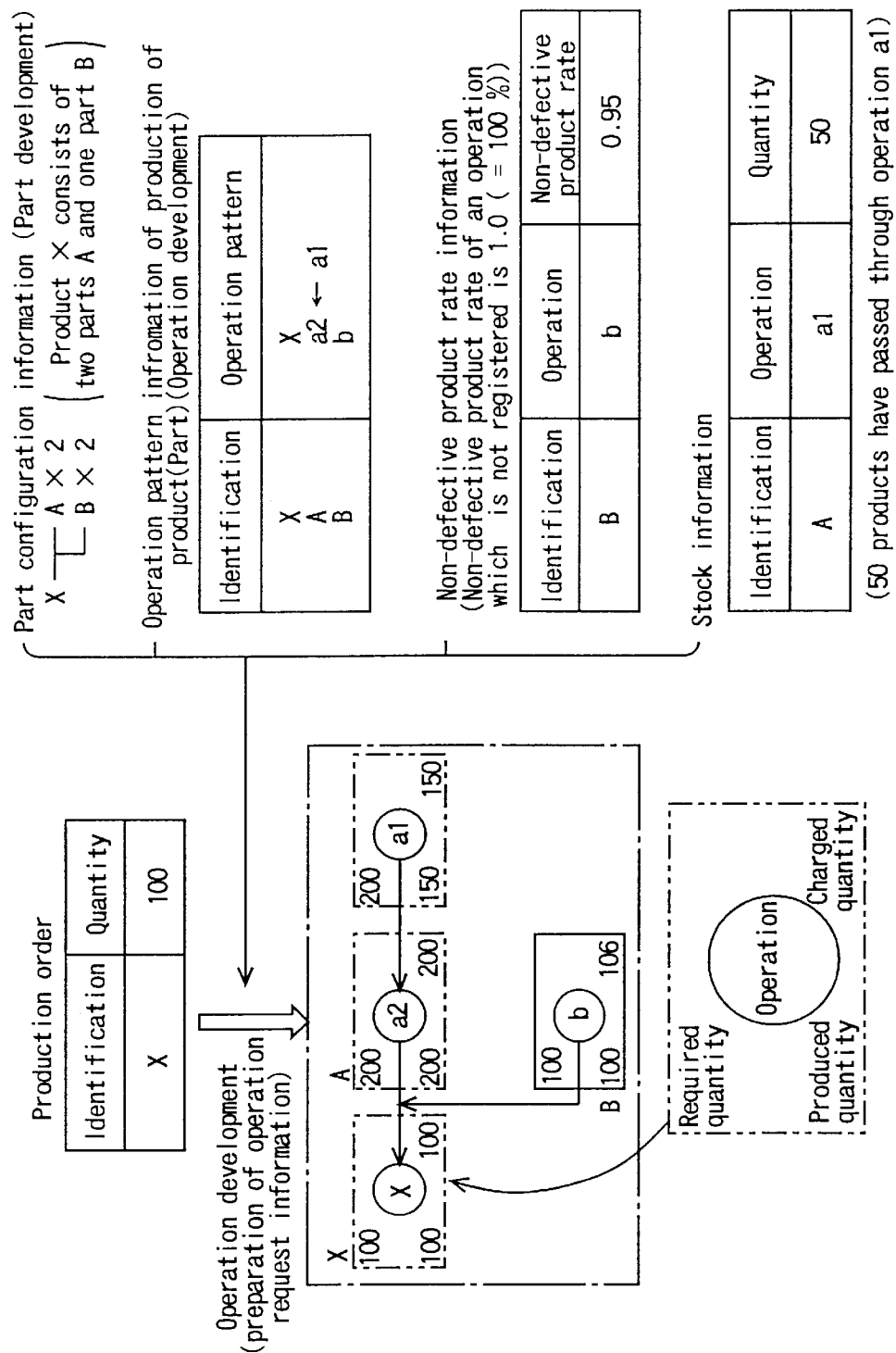
FIG. 5 is a diagram illustrating a specific example of the operation request information preparing processing in the present invention.

FIG. 5 is a diagram illustrating an example of the operation request information preparing processing which shows the method of planning a production schedule of the processing in the embodiment by using specific values.

In FIG. 5, when an order of 100 products identified by X is given, a search operation is first conducted on the completed product stock. If there is no product X in the completed product stock, the number of the production order is set to be 100. The part configuration information for the products X indicates that the product X consists of two parts A and one part B. The parts A are produced by the sequence of operations a1 and a2, and the part B is produced by operation b.

The non-defective product rate information of the products X indicates that the non-defective product rate of the part A is 1.0 (100%) and that of the part B is 0.95 (95%). In other words, the information indicates that a defective one of the part B appears at the rate of 0.05% in the process.

The stock information for the products X indicates that 50 products have passed through the operation a1.

As indicated in the frame designated by the reference symbol Z in FIG. 5, 100 products X are produced from 200 parts A and 100 parts B. In the operation a1, in consideration of the stock (50 sets), 150 sets of components are charged and the parts A are produced in the production number of 150. As a result, the necessary number of or 200 sets of components for the parts A are ensured. In the next operation a2, 200 sets of components are charged and the parts A are produced in the production number of 200 with the result that the necessary number of or 200 parts A are produced.

By contrast, the parts B are produced in the following manner. In the operation b, in consideration of the non-defective product rate (0.95), 106 sets of components are charged and the parts B are produced in the production number of 100. As a result, the necessary number of or 100 sets of the parts B are ensured.

The 200 parts A and the 100 parts B which are produced as described above are subjected to operation x and 100 products X are produced.

Figure 6:
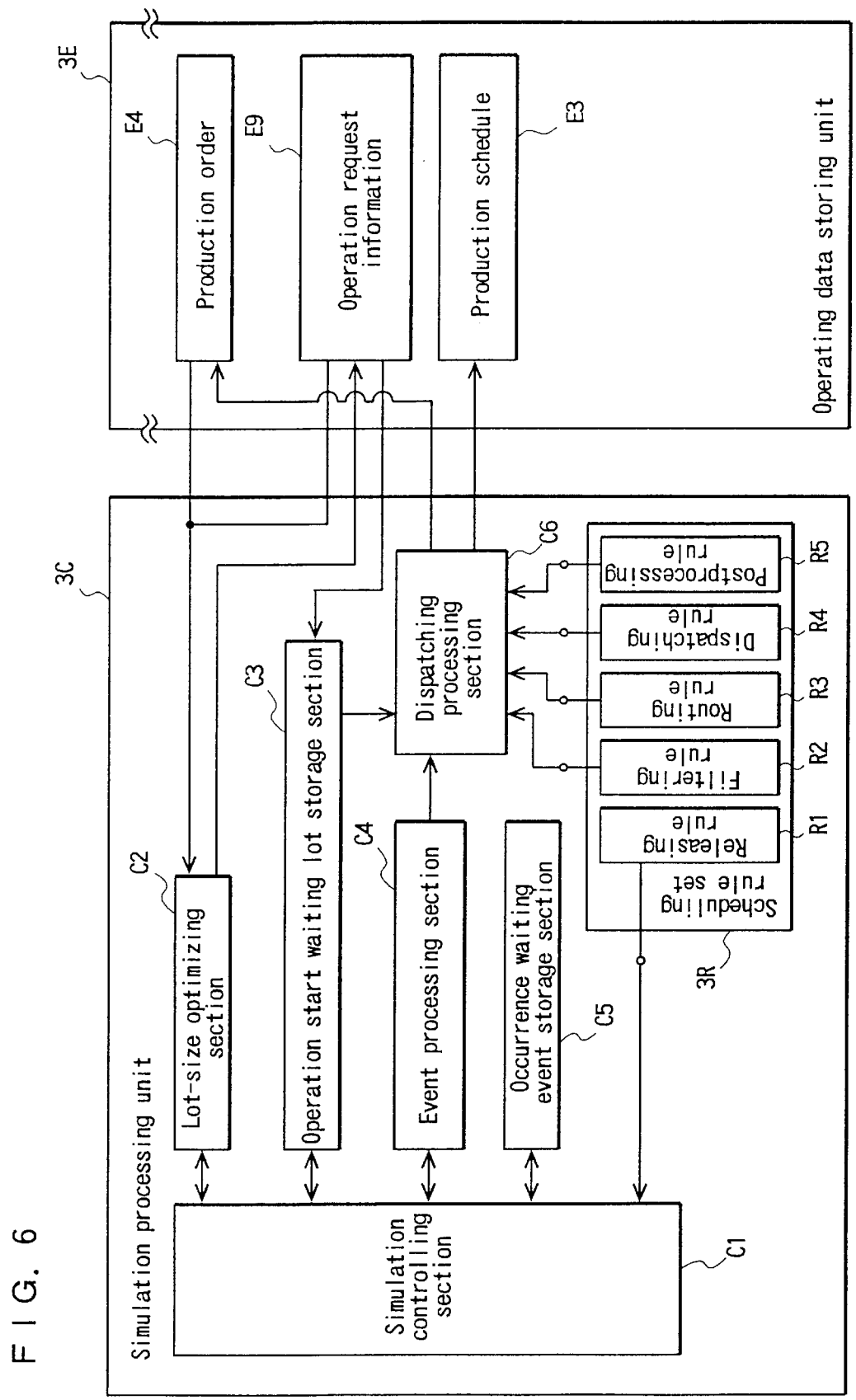
FIG. 6 is a block diagram showing a simulation processing in the embodiment of FIG. 1.
Figure 7:
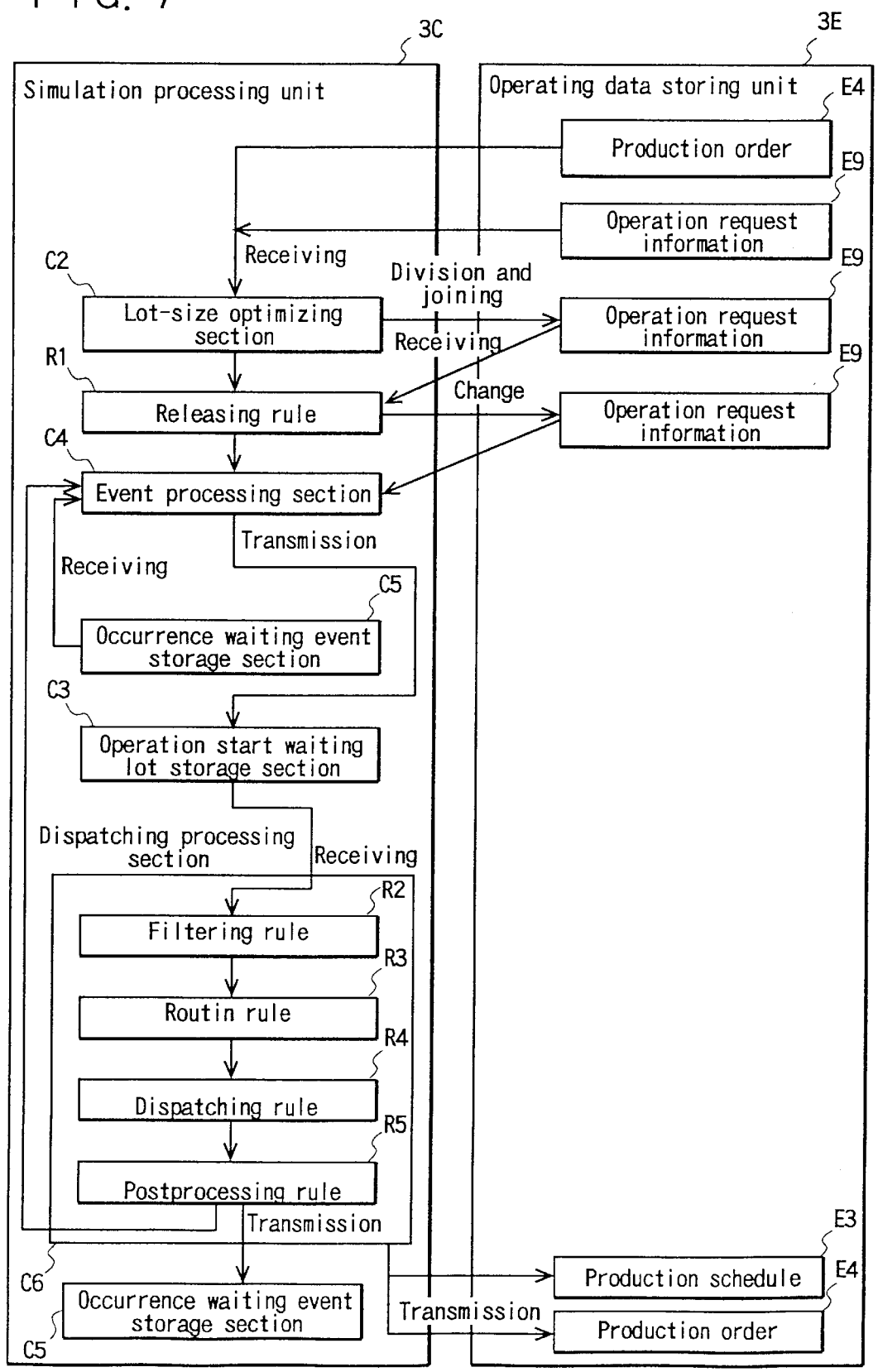
FIG. 7 is a diagram showing the flow of the simulation processing of FIG. 6.

Next, the simulation processing in the simulation processing unit 3C of the embodiment will be described with reference to the figures. FIG. 6 is a block diagram showing the simulation processing unit 3C and a portion of the operating data storing unit 3E which relate to the simulation processing for planning a production schedule, and FIG. 7 is a diagram showing the flow of the operation in the simulation processing unit 3C which is conducted up to the planning of the production schedule.

First, the operation request information E9 of the operating data storing unit 3E, and the production order E4 relating thereto are sent to the simulation processing unit 3C.

In the simulation processing unit 3C, a lot-size optimizing section C2 conducts division and joining of operation requests in the operation request information E9. In this example, among the operation request information E9, an operation request having a lot size which is larger than an optimum lot size is divided, so that the resulting lot size becomes closer to the optimum lot size, and an operation request having a smaller lot size is joined with another operation request which is identical in product number and operation with the operation request, so that the resulting lot size becomes closer to the optimum lot size.

In order to determine the division and joining of an operation request(s), various strategy may be employed. In the case of joining of operation requests, particularly, the manner of considering the operation start enabled date and hour and the delivery time plays an important role.

Next, the planning of the production schedule which is based on forward simulation along the time axis is caused to proceed by a simulation controlling section C1. With respect to an operation request (operation request information) which is obtained as a result of joining in the lot-size optimizing section C2, the operation start enabled date and hour are set to be equal to the latest date and hour among the respective operation start enabled dates and hours, and the whole of the operation is regarded as one lot and subjected to the dispatching process at one time.

After the above-mentioned lot-size optimizing process, the simulation processing unit 3C sets charge enabled dates and hours of the respective products in the production order, by using a releasing rule R1 of a scheduling rule set 3R. In the case where the charging date of a specific product is preset, for example, information indicative of the charging date is previously incorporated into the releasing rule R1, and the charge enabled date of the product is determined in accordance with the releasing rule R1.

After the charge enabled dates and hours of the products in the production order are set, the simulation processing unit 3C operates as an event driven simulator. Each time when an event which enables operation request information to be started, such as arrival of materials, occurs, the operation request information is stored in an operation start waiting lot storage section C3.

Referring to FIG. 6, an event is caused by an event processing section C4 on the basis of information from an occurrence waiting event storage section C5. In the simulation, an event which causes a certain state is captured, attention is directed to the kind of an event which occurs at a certain timing, and the event is written, thereby advancing the simulation.

Each time when an event in which possibility of dispatching arises, such as arrival of materials, and release of the equipment (end of production, end of maintenance) occurs, the control is transferred to a dispatching processing section C6.

As shown in FIG. 7, the dispatching processing section C6 fetches all of the operation request information stored in the operation start waiting lot storage section C3. The operation request information is then subjected to preliminary selection by using a filtering rule R2. Specific examples of the filtering rule R2 include a process which is conducted in order to eliminate an operation and a lot with sufficient lead time to the delivery, or those in which the currently available production equipment necessitates a process of switching product or part identifications.

Next, an appropriate resource is selected from the currently available resources by using a routing rule R3. Specific examples of the routing rule R3 include various processes such as a process in which a resource which is firstly available is selected, and that in which a resource having the highest throughput is selected from the currently available resources.

Among operations and lots which are preliminarily selected by the filtering rule R2 and which can be dispatched in the resource selected by the routing rule R3, thereafter, one operation and one lot are selected by using a dispatching rule R4. The dispatching processing section C6 then determines the schedule of the selected operation and lot. Specific examples of the dispatching rule R4 include various processes such as a process which selects an operation and a lot which can be started at the earliest time, that which selects an operation and a lot of the highest production capacity, and that which selects an operation and a lot which can obtain a product with a high accuracy.

The information of the dispatched operation and lot, and that of the resource are sent to a postprocessing rule R5, and then undergo a necessary postprocessing. Specific examples of the postprocessing rule R5 include a process in which the dispatched operation and lot are forcedly incorporated immediately after an operation of a product of the same kind, thereby suppressing the process of switching part identifications to the minimum degree.

The simulation processing unit 3C conducts the dispatching process as described above, and thereafter causes the new production schedule E3 planned after the order change, and the production order E4 labeled as information which is already included in the production schedule to be stored in the operating data storing unit 3E.

As seen from the above description, in the apparatus for planning a production schedule of the present invention, the process portion for dispatching an operation to a resource such as the production equipment on the basis of the operation request information is configured so that the determination of the dispatching is divided into:

(1) the releasing rule which sets the date and hour when a production order can be charged into the operating process;

(2) the filtering rule which preliminarily selects (eliminates) an operation and a lot which are to be dispatched when an operation is enabled, or when arrival of materials, release of the equipment, or the like occurs;

(3) the routing rule which selects a resource to which the operation is dispatched;

(4) the dispatching rule which selects an operation and a lot which are to be dispatched; and (5) the postprocessing rule which conducts an additional processing or the like on the basis of information of the dispatched operation and the resource, and these rules are independently configured as a scheduling rule set in which each rule can be selected and incorporated into the main unit.

In the apparatus for planning a production schedule of the present invention configured as described above, when a production schedule is to be planned from operation request information in simulation, the charge enabled date and hour for each production order is first set in accordance with the releasing rule. In other words, the date and hour when charging is enabled after the date and hour at which the processing can be started is strategically set. The date and hour at which the processing can be started are set on the basis of the preparation period of raw materials, the period when the process can be used, the delivery time, a uniform production lead time, and the like. Therefore, the apparatus for planning a production schedule of the present invention can cope with various requests for processing by configuring the rules as independent elements. Specifically, it may be contemplated that charge enabled dates and hours are dispersed in consideration of the load condition of the whole of the process, in order to shorten the in-process residence period of each workpiece.

After the event processing cycle is started, an operation and a lot are selected in accordance with the filtering rule, the routing rule, and the dispatching rule, and then dispatched. A combination of an operation and a lot is finally determined in accordance with the routing rule and the dispatching rule. The provision of the filtering rule allows the preliminary selection using a simple evaluation function and the final selection (the dispatching rule) using a precise function to be separately provided. As a result, a high-level production schedule can be rapidly planned.

In the method of planning a production schedule of the present invention, an operation and a lot which are inconvenient for dispatching in the simulation, such as those which necessitate a process of switching part identifications can be positively eliminated, and release of the equipment which is producing a product of the same product identification is waited. After dispatching, the postprocessing rule is applied by using the information of the dispatching. For example, by incorporating a process in which the dispatched operation of a product is forcedly scheduled immediately after an operation of a product of the same product identification, or the like, it becomes possible to plan such a production schedule of a reduced number of switching processes that which is difficult to do in a temporal simulation.

As seen from the above description, according to the method and the apparatus for planning a production schedule of the present invention, an effective production schedule in which the in-process intermediate stock and the like are considered can be planned also for a complex operating process such as machining, and an executable production schedule which can suppress the change of the process due to an order change to a minimum level can be rapidly planned. Therefore, the method and the apparatus can prevent the stock from being Increased, and support an early delivery in response to an order.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of planning a production schedule comprising:
    an operating data storing step of, in order to plan a production schedule in a processing factory, storing management data such as order information, stock information, and a production schedule, and basic data of said processing factory;
    a completed product stock allocating step of allocating order information to completed product stock information, and determining an order to be produced;
    a production schedule allocating step of integrating an order among orders to be produced, said order being included in a previous production schedule planned before an order change, into a new production schedule as a production-scheduled order;
    a production schedule deleting step of deleting a production schedule of said previous production schedule planned before an order change, this production schedule not including the orders to be produced;
    an operation request information preparing step of determining a production order from the orders to be produced, the production order being to be again subjected to planning of said new production schedule, said operation request information preparing step comprising:
        an operation developing step of preparing operation request information for determining a sequence of operations to be executed, from operation pattern information for producing a product for each production order, and obtaining said operation request information consisting of at least one operation pattern;
        an operation unit production quantity calculating step of allocating operation request information for each production order to an intermediate stock, and obtaining a quantity which is to be actually produced, for each operation;
        an operation unit charge quantity calculating step of obtaining a quantity to be charged, on the basis of non-defective product rate information of each operation; and
    a simulation processing step which comprises:
        a lot-size optimizing step of dividing an operation request or joining operation requests so that an optimum lot size is obtained in accordance with a kind of an operation; and
        a simulation step of conducting scheduling at the optimized lot size, and said simulation step having a scheduling rule set in order to dispatch a prepared operation request to a resource such as production equipment in a simulation system said, scheduling rule set having
            a releasing rule which determines charge enabled dates and hours for the production orders;
            a filtering rule which preliminarily selects an operation;
            a routing rule which selects a resource such as equipment;
            a dispatching rule which dispatches a prepared operation request to a selected resource; and
            a postprocessing rule which, immediately after dispatching conducts a control on subsequent dispatching on the basis of information of the dispatching.

2. A method of planning a production schedule in accordance with claim 1, wherein said operation request information preparing step further comprises:

a part developing step of, in a case where the product is configured by plural parts or where a specific intermediate part is changed to different parts or products as a result of a subsequent processing, developing parts of the product, thereby preparing part configuration information.

3. An apparatus for planning a production schedule comprising:

operating data storing means for, in order to plan a production schedule in a processing factory, storing management data such as order information, stock information, and a production schedule, and basic data of said processing factory;

completed product stock allocating means for allocating order information to completed product stock information, and determining an order to be produced;

production schedule allocating means for integrating an order among orders to be produced, the order being included in a previous production schedule planned before an order change, into a new production schedule as a production-scheduled order;

production schedule deleting means for deleting a production schedule of said previous production schedule planned before an order change, this production schedule not including the orders to be produced;

operation request information preparing means for determining a production order from the orders to be produced, the production order being to be again subjected to planning of a production schedule, said operation request information preparing means comprising;

operation developing means for preparing operation request information for determining a sequence of operations to be executed, from operation pattern information for producing a product for each production order, and obtaining said operation request information consisting of at least one operation pattern;

operation unit production quantity calculating means for allocating operation request information for each production order to an intermediate stock, and obtaining a quantity which is to be actually produced, for each operation;

operation unit charge quantity calculating means for obtaining a quantity to be charged, on the basis of non-defective product rate information of each operation; and a simulation processing means which comprises;

lot-size optimizing means for dividing an operation request or joining operation requests so that an optimum lot size is obtained in accordance with a kind of an operation; and simulation means which conducts scheduling at the optimized lot size and in order to dispatch a prepared operation request to a resource such as production equipment in a simulation system, said simulation means comprises a scheduling rule set having:

a releasing rule which determines charge enabled dates and hours for the production orders;

a filtering rule which preliminarily selects an operation;

a routing rule which selects a resource such as equipment;

a dispatching rule which dispatches a prepared operation request to a selected resource; and a postprocessing rule which, immediately after dispatching, conducts a control on subsequent dispatching on the basis of information of the dispatching.

4. An apparatus for planning a production schedule in accordance with claim 3, wherein said operation request information preparing means further comprises:

part developing means for, in a case where the product is configured by plural parts or where a specific intermediate part is changed to different parts or products as a result of a subsequent processing, developing parts of the product, thereby preparing part configuration information.

* * * * *